United States Patent
Arai et al.

(10) Patent No.: US 6,805,446 B2
(45) Date of Patent: Oct. 19, 2004

(54) REAR PROJECTOR

(75) Inventors: Jun Arai, Suwan (JP); Haruyoshi Yamada, Suwan (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/372,927

(22) Filed: Feb. 26, 2003

(65) Prior Publication Data
US 2003/0189695 A1 Oct. 9, 2003

(30) Foreign Application Priority Data
Mar. 13, 2002 (JP) ........................................ 2002-069343

(51) Int. Cl.[7] .................. G03B 21/16; G03B 21/22; H04N 5/64; H04N 5/74
(52) U.S. Cl. .................. 353/61; 353/119; 348/748; 348/836
(58) Field of Search ............................ 353/57, 58, 60, 353/61, 52, 119; 348/748, 836, 778, 843, 789, 794

(56) References Cited

U.S. PATENT DOCUMENTS

| | | | |
|---|---|---|---|
| 5,808,704 A | * | 9/1998 | Yoshikawa et al. ......... 348/748 |
| 6,040,877 A | * | 3/2000 | Won ............................ 348/748 |
| 6,443,575 B1 | * | 9/2002 | Miyamoto et al. ............ 353/58 |
| 6,450,646 B1 | * | 9/2002 | Ono et al. ..................... 353/57 |
| 6,533,421 B2 | * | 3/2003 | Ono ............................ 353/61 |
| 6,565,214 B1 | * | 5/2003 | Shinobu ....................... 353/74 |
| 6,618,213 B2 | * | 9/2003 | Inamoto ..................... 359/889 |
| 6,688,713 B2 | * | 2/2004 | Lowe ......................... 348/836 |
| 6,709,114 B1 | * | 3/2004 | Duggan et al. ............. 348/843 |

FOREIGN PATENT DOCUMENTS

JP  A 08-304739  11/1996

* cited by examiner

Primary Examiner—Christopher Mahoney
(74) Attorney, Agent, or Firm—Oliff & Berridge, PLC (57) ABSTRACT

A rear projector (1) has a closed space (530) including an inside of an upper cabinet (12) and an electric optical device (44), where the electric optical device (44), a sirocco fan (541) located below the electric optical device (44), a duct (542) covering the upper side of the electric optical device (44) and a heat sink (543) attached to the upper cabinet (12) are disposed and an upper cabinet cooling system (600) that cools the interior of the closed space (530) in a circulative manner is provided in the closed space (530), thereby preventing invasion of duct etc. and providing high-quality image.

9 Claims, 6 Drawing Sheets

REAR PROJECTOR

BACKGROUND OF THE INVENTION

1. Field of the Invention

The present invention relates to a rear projector having an image generator including an electric optical device for modulating a light beam irradiated by a light source to form an optical image in accordance with image information and a projection optical system for enlarging and projecting the optical image, a casing for disposing the image generator, and a screen exposed on one of the lateral sides of the casing onto which the optical image formed by the image generator is projected

2. Description of Related Art

Recently, a rear projector has come to be used in the field of home theater etc. Such rear projector has an image generator for generating a projection image, a box-shaped casing disposing the image generator and a reflection mirror for reflecting the projected image and a transmissive screen exposed to a side of the box-shaped casing.

The image generator has a light source lamp, an optical device such as a liquid crystal panel for modulating a light beam irradiated by the light source lamp in accordance with image information, and a projection optical system such as a projection lens for enlarging and projecting the generated optical image.

The optical image formed by the image generator is projected on a transmissive screen after being reflected by a mirror etc., so that the image transmitted through the screen is viewed.

Such rear projector also accommodates acoustic device such as a speaker inside the casing thereof, so that the large-screen image has much presence with the use of the acoustic device.

Incidentally, the image generator of such rear projector has the light source lamp, a light source driving block for driving the light source lamp, and a power source block for supplying electric power to the board for controlling the drive of the optical device, all of which are heat source. On the other hand, some of the components of the optical device etc. are weak against heat. Accordingly, it is important to cool the interior of the projector efficiently.

In a conventional arrangement, an intake opening and an exhaust opening are provided on a front side of a casing of a rear projector, i.e. on the side provided with a screen, through which the cooling air is introduced into/discharged from the projector.

However, when the external air is used to cool the electric optical device, dust etc. flowing outside may sometimes be sucked in together with the air. When the dust etc. is adhered on an image formation area of the electric optical device, the dust is displayed as shadow on the screen, thereby deteriorating the quality of the image displayed on the screen.

It is possible to provide a filter etc. on the intake opening to prevent dust from being sucked in, improvement in cooling efficiency by increasing the amount of the sucked air often hinders improvement in dust proofness, so that it is difficult to securely prevent the dust while improving the cooling efficiency.

SUMMARY OF THE INVENTION

An object of the present invention is to provide a rear projector capable of securely avoiding invasion of dust while improving cooling efficiency.

A rear projector according to an aspect of the present invention comprises: an image generator having an electric optical device that modulates the light beam irradiated by a light source to form an optical image in accordance with image information and a projection optical system that enlarges and projects the optical image; a casing that disposes the image generator; and a screen exposed on one of the sides of the casing onto which the that disposes the image generator and a second casing provided with the screen, the electric optical device being located in a closed space including a space inside the second casing, where a circulation fan that circulates an air inside the closed space is provided in the closed space.

Though the electric optical device is cooled by circulating the air inside the closed space, the other component such as the light source lamp and the power source block may preferably be cooled by drawing outside air from the intake opening as in the conventional arrangement. This is because adhesion of slight dust to the components scarcely influences on the image quality unlike the electric optical device.

According to the present invention, since the electric optical device can be cooled by circulating the air inside the closed space by the circulation fan, invasion of dust from the outside can be prevented while efficiently cooling the electric optical device.

Further, since the large screen of forty to sixty inches is provided on the second casing and vast space can be secured inside the second casing, the electric optical device can be sufficiently cooled by the vast space.

In the above arrangement, the circulation fan may preferably be located opposite to the second casing relative to the electric optical device.

According to the above arrangement, since the electric optical device can be cooled by the air discharged by the circulation fan and the air having cooled the electric optical device is discharged to and circulated in the space inside the second casing, the electric optical device can be cooled by the entire air inside the closed space, thereby enhancing cooling efficiency.

In the above arrangement, a radiator that radiates the heat inside the second casing to cool the air may preferably be provided on the second casing.

The radiator may preferably have a heat receiver provided inside the second casing and a plurality of cooling fins connected with the heat receiver and projected to the outside of the second casing, which may be a heat sink having integrated heat receiver and cooling fin. Alternatively, the heat receiver and cooling fin may be separately formed and a Peltier element is used as the heat receiver, thus forcibly radiates the heat inside the second casing toward outside.

According to the above arrangement, since the heat of the air heated after cooling the electric optical device is radiated to the outside of the casing, the cooling efficiency can be enhanced.

Since the heat sink integrating the heat receiver and the cooling fin is used as the radiator, the construction can be simplified and the number of the component can be reduced.

On the other hand, when a Pertier element is used as the heat receiver, heat migration from the inside of the casing to the outside can be controlled, thereby further enhancing cooling efficiency.

In the above arrangement, a duct that guides the air discharged by the circulation fan along the inner circumference of the casing may preferably be provided inside the second casing. At this time, the duct may preferably cover the electric optical device.

According to the above arrangement, since the air convection inside the second casing can be controlled by the duct, the electric optical device can be cooled using the entire air inside the second casing.

Further, since the duct covers the electric optical device, the light leaked from the electric optical device can be blocked, thereby preventing deterioration of contrast of the projected image caused when the leaked light is projected on the screen.

The circulation fan may preferably be a sirocco fan that discharges the air drawn in rotation axis direction to rotary tangential line direction.

According to the above arrangement, since the discharge pressure of air can be increased, the air inside the large closed space including the interior of the second casing can be securely circulated. This is because the sirocco fan has relatively small opening area on the discharge side as compared to the opening area of the air-drawing side thereof and because the discharge pressure can be increased by discharging the air in a rotary tangential direction.

DETAILED DESCRIPTION OF PREFERRED EMBODIMENT(S)

An embodiment of the present invention will be described below with reference to attached drawings.

[1. Primary Arrangement of Rear Projector]

Figure 1:
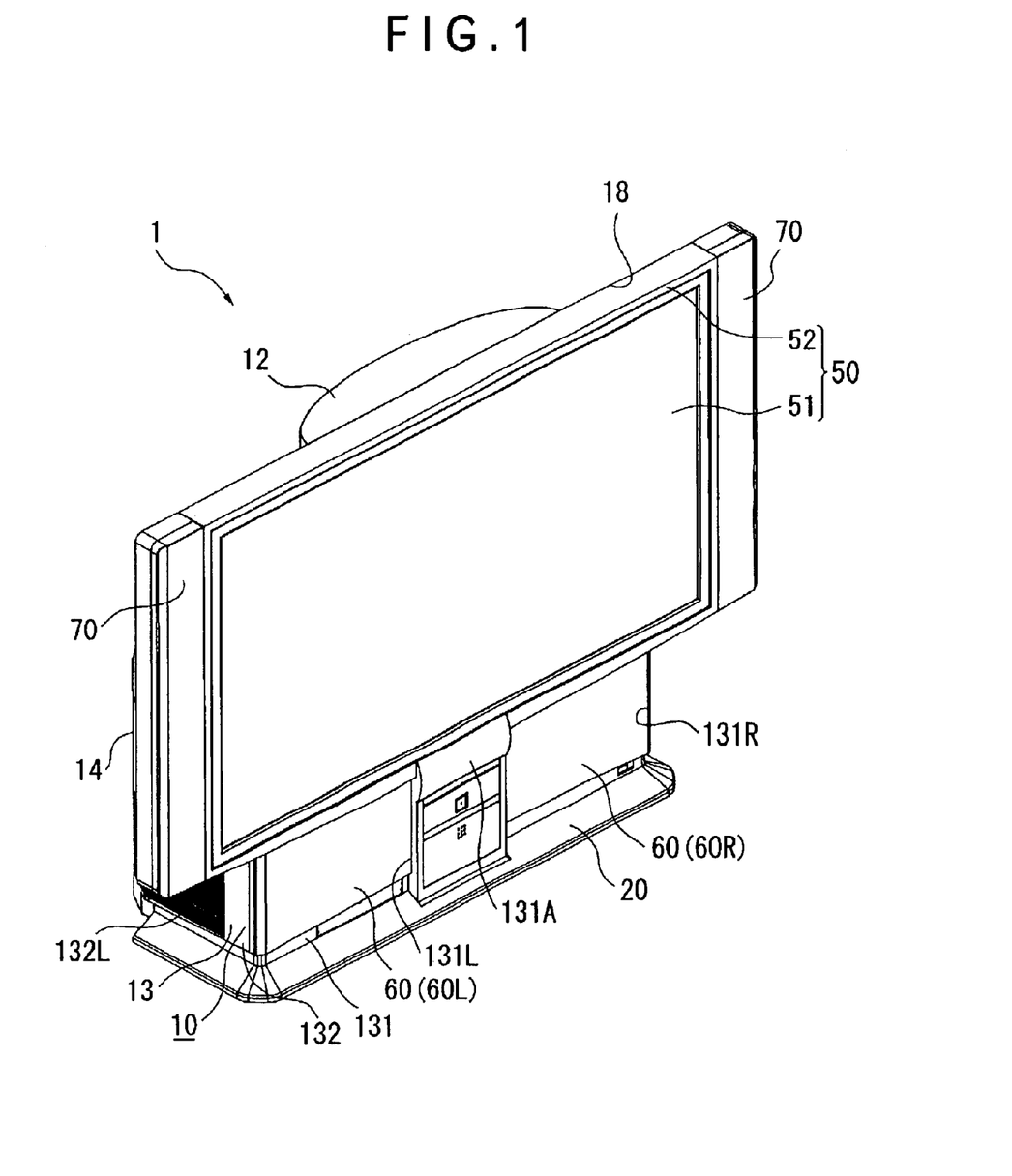
FIG. 1 is a perspective view showing a rear projector according to an aspect of the present invention.
Figure 2:
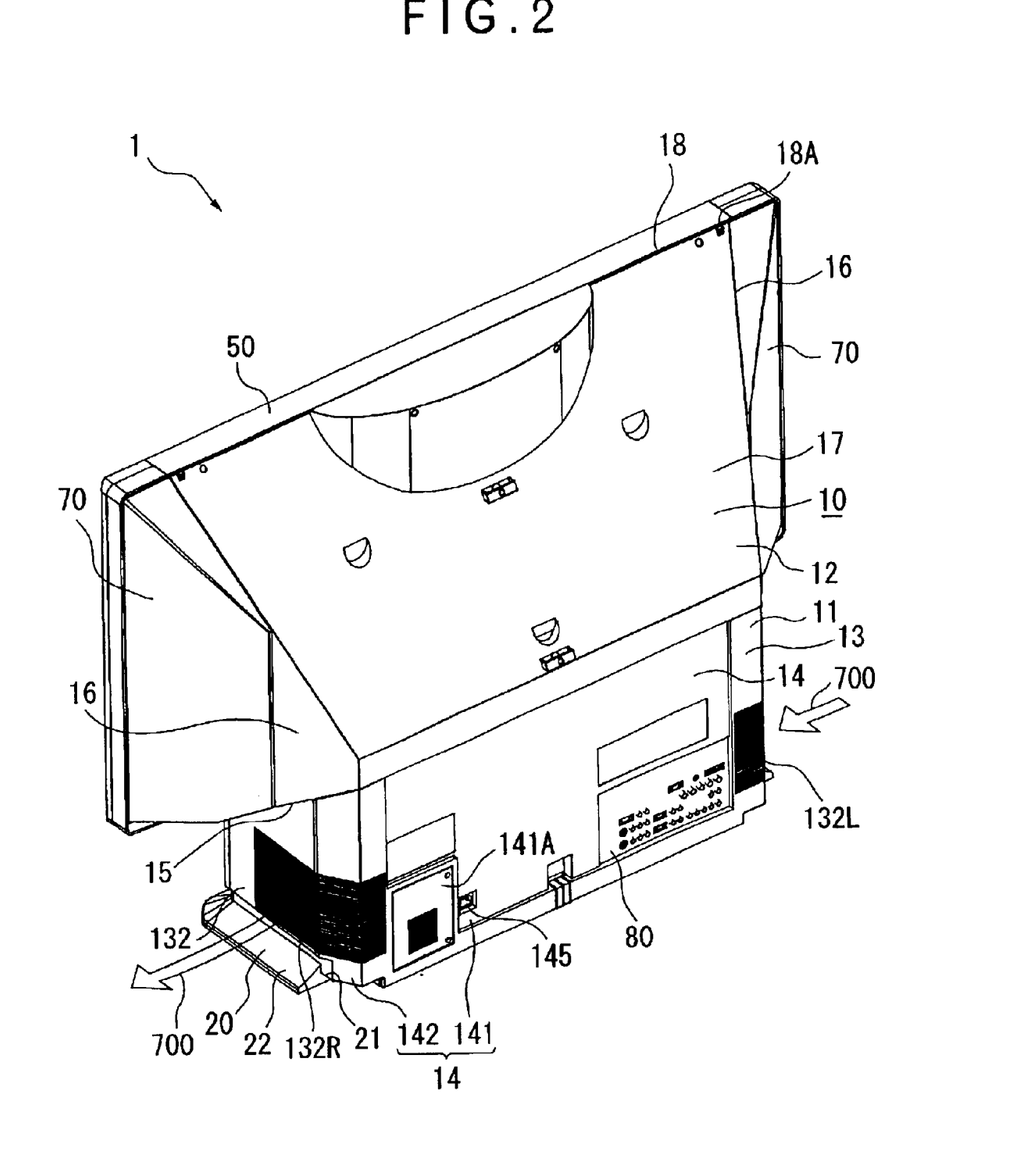
FIG. 2 is a perspective view showing the rear projector seen from rear side.
Figure 3:
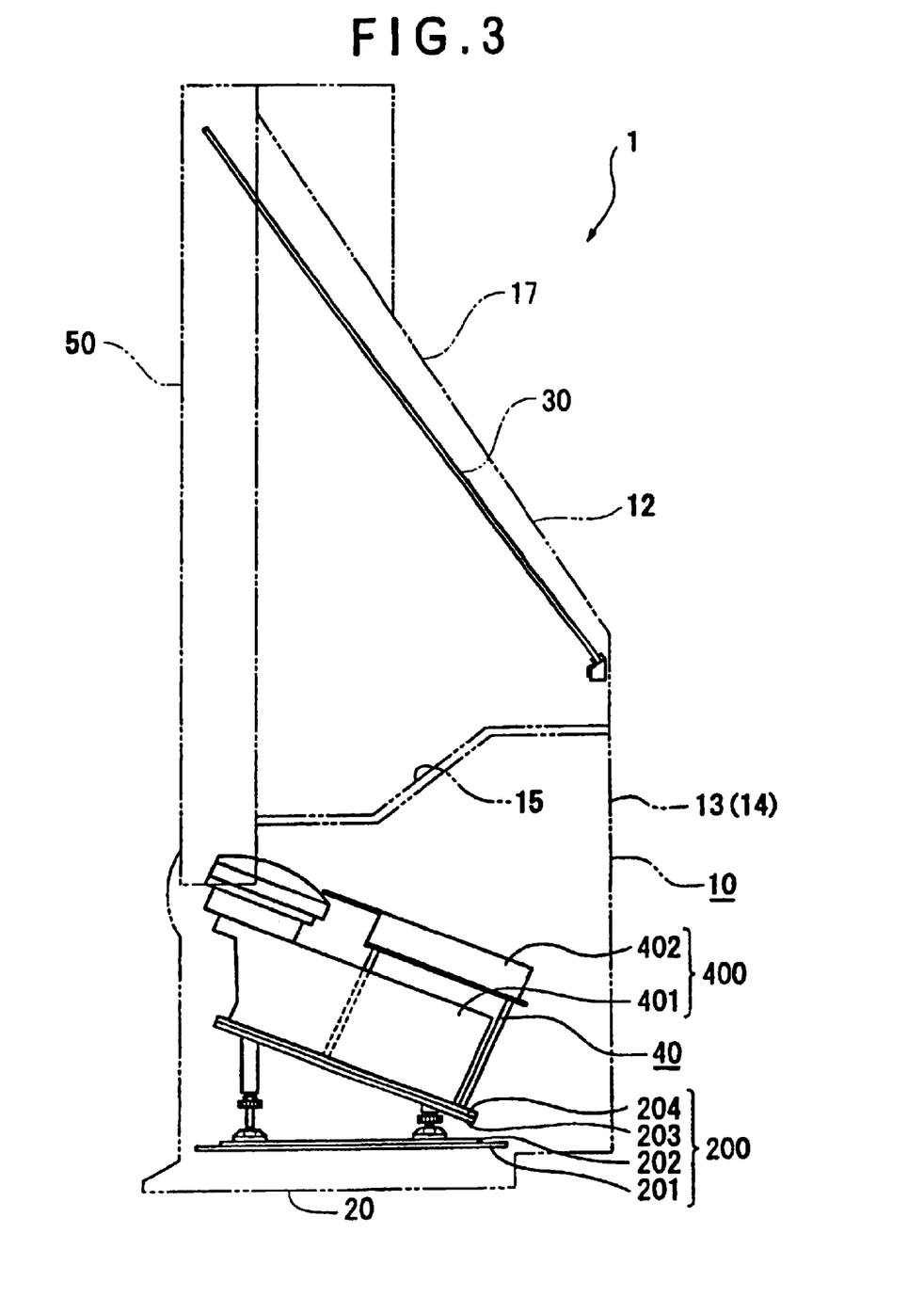
FIG. 3 is a vertical cross section schematically showing the rear projector.

FIG. 1 is a perspective view seen from front side of a rear projector 1 according to an aspect of the present invention. FIG. 2 is a perspective view of the rear projector 1 seen from rear side thereof. FIG. 3 is a vertical cross section schematically showing the rear projector 1.

As shown in FIGS. 1 to 3, the rear projector 1 modulates a light beam irradiated by a light source in accordance with image information to form an optical image, and enlarges and projects the optical image on a screen. The rear projector 1 includes a cabinet 10 constituting a casing, a leg 20 provided on the lower side of the cabinet 10, a reflection mirror 30 located inside the cabinet 10, an interior unit 40 located inside the cabinet 10, and a screen unit 50 exposed on a side of the cabinet 10. The reflection mirror 30 and the interior unit 40 constitute an image generator.

Incidentally, for the convenience of explanation, left side seen from front side (i.e. a side provided with the screen) is referred to as left and right side seen from front side is referred to as right in the present embodiment.

The cabinet 10 is a casing of synthetic resin for disposing the interior unit 40 and the reflection mirror 30. As shown in FIGS. 1 to 3, the cabinet 10 accommodates the interior unit 40 and has a lower cabinet 13 of C-shaped vertical cross section as a first casing covering approximately entire front, upper and lower sides and right and left sides, a back cover 14 covering the rear side and a part of the right and left sides, and an upper cabinet 12 of triangle vertical cross section as a second casing disposed on the upper side of the lower cabinet 13.

The dimension of the lower cabinet 13 in right and left direction along the surface of the screen unit 50 is smaller than the dimension of the upper cabinet 12 in right and left direction along the surface of the screen unit 50.

The back cover 14 is detachably attached to the lower cabinet 13.

As partially shown in FIG. 1, the lower cabinet 13 includes a front side 131, right and left lateral sides 132, an upper side and a lower side.

As shown in FIG. 1, a central portion 131A bulging toward front side in accordance with projection of a projection lens of the interior unit 40 is provided approximately at the center of the front side 131. Rectangular openings 131R and 131L of approximately the same dimension are formed on both sides of the central portion 131A. Woofer boxes 60 (60R and 60L) as a speaker for reproducing low-pitched sound are respectively attached to the openings 131R and 131L. The woofer boxes 60R and 60L are attachable to and detachable from the openings 131R and 131L from the front side.

Incidentally, though not clearly shown in the illustration, various device-connecting terminals such as connector for connecting a computer, a video input terminal and audio-connection terminal are provided on the lower side of the left opening 131L.

Further, as shown in FIGS. 1 and 2, slit-shaped openings are formed on the right and left lateral sides 132 of the lower cabinet 13. The left opening is an intake opening 132L for introducing a cooling air into the interior of the projector and the right opening is an exhaust opening 132R for discharging the air having introduced and cooled the interior of the projector.

The upper side of the lower cabinet 13 opposes the lower side of the below-described upper cabinet 12 and the lower side of the lower cabinet 13 abuts to a below-described receiver surface of the leg 20.

As shown in FIG. 2, the back cover 14 includes a rear side 141 and right and left lateral sides 142. A second intake opening 141A for introducing cooling air through an air filter is provided on the right side (rear side seen from rear side) of the rear side 141. An opening for inlet connector 145 is formed on the left side of the second intake opening 141A of the rear side 141. An interface board 80 is provided on the left side of the opening on the rear side 141 for various connection terminal including computer connection terminal and video input terminal.

As shown in FIGS. 2 and 3, the upper cabinet 12 is a casing of triangle vertical cross section for disposing the reflection mirror 30, which includes a lower side 15 of approximately rectangle plate, right and left lateral sides 16 of triangle plate vertically extending from both ends of the lower side 15, a rear side 17 spanning over the right and left sides and slanting toward the lower rear side, and a front side 18 of approximately rectangle plane. Rectangular opening 18A is formed on the planar front side 18. A screen unit 50 covering the opening 18A is attached to the front side 18.

As shown in FIGS. 1 and 2, the leg 20 is a component made of synthetic resin that supports the cabinet 10 on the upper side of a floor or a desk, which supports the entire lower side of the lower cabinet 13 by a receiver surface 21 and is in contact with the upper side of floor etc. with a rib-shaped support 22 surrounding the backside of the receiver surface 21.

As shown in FIG. 3, the reflection mirror 30 reflects the light beam irradiated by the projection unit as a component of the internal unit 40 and projects on the backside of the screen unit 50, which is a reflection mirror formed in approximate trapezoid, though not clearly shown in FIG. 3. The reflection mirror 30 is attached to the inner side of the rear side 17 of the upper cabinet 12 through a support member to prevent distortion etc. so that longer edge comes to the upper side.

The interior unit 40 is a device for forming a predetermined optical image in accordance with inputted image information and outputting sound and image by amplifying the sound signal added to the image information. The interior unit 40 has an interior unit body 400, a support member 200 made of metal such as aluminum for supporting the interior unit body 400 at a predetermined attitude, a first power source, and a second power source both of which is not illustrated.

Though not clearly shown in FIG. 3, the interior unit body 400 has a planarly-viewed L-shaped optical unit 401 extending from the right side to the center and front side, and a control board 402 spanning over a part of the optical unit 401.

Figure 4:
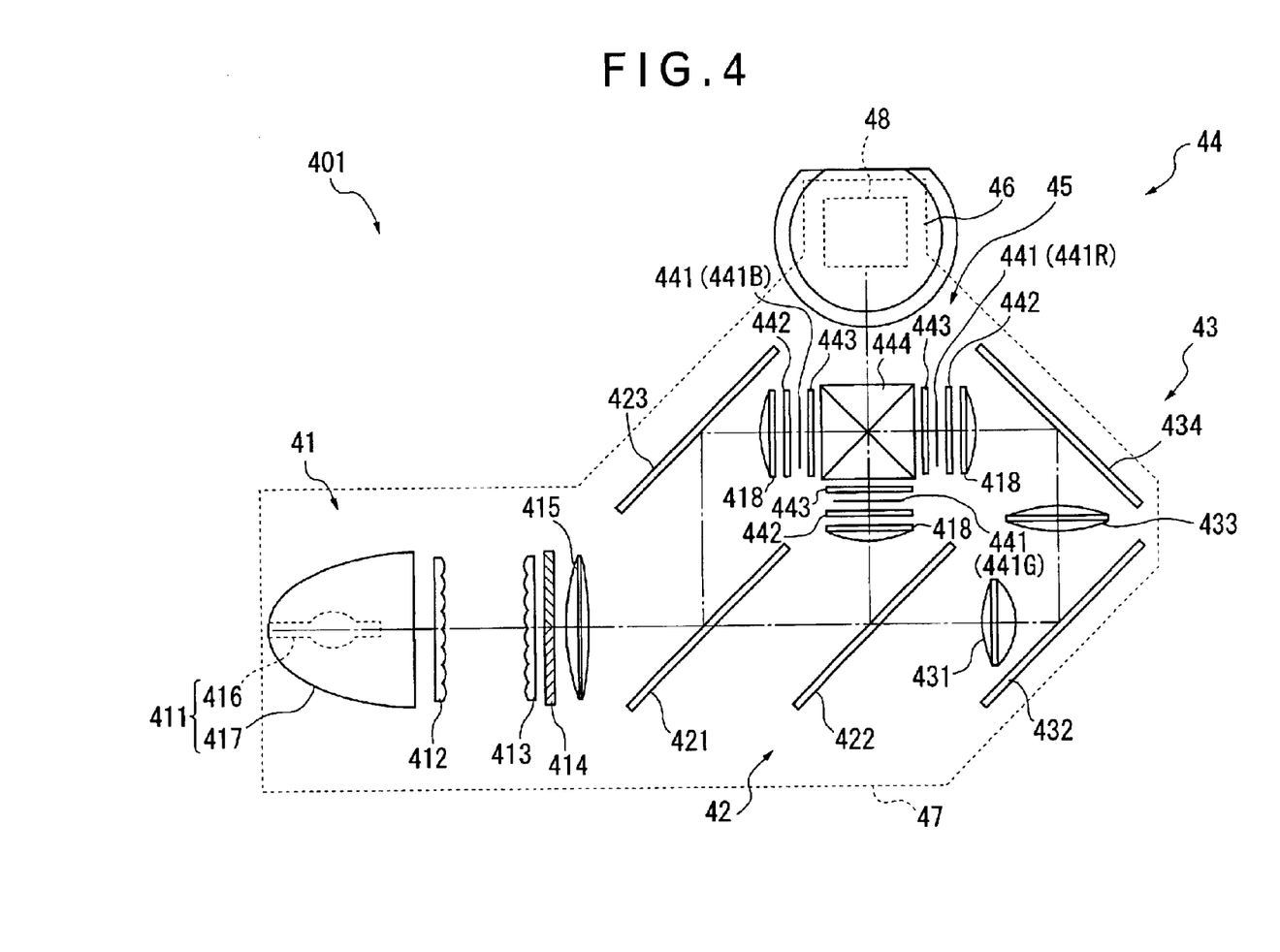
FIG. 4 is a schematic illustration showing an optical unit as a component of the rear projector.

FIG. 4 is a plan view schematically showing the optical unit 401.

As shown in FIG. 4, the optical unit 401 is a unit for optically processing the light beam irradiated by a light source lamp as a component of the light source to form an optical image in accordance with image information, which includes an integrator illuminating optical system 41, a color separating optical system 42, a relay optical system 43, an optical device 44, a right-angle prism 48 and the projection lens 46 as a projection optical system.

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes a light source 411, a first lens array 412, a second lens array 413, a polarization converter 414 and a superposing lens 415.

The light source 411 has a light source lamp 416 as a radiation light source and a reflector 417, which changes the radial light beam irradiated by the light source lamp 416 into a parallel light beam by the reflector 417 to emit the parallel light beam toward the outside.

A halogen lamp is used as the light source lamp 416. Incidentally, metal halide lamp and a high-pressure mercury lamp etc. may be used instead of the halogen lamp.

A parabolic mirror is used as the reflector 417. Incidentally, a combination of a lens which parallelized nonparallel light reflected by the reflector and an ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415 and is integrated with the second lens array 413 as a unit. The polarization converter 414 converts the light from the second lens array 413 to a single polarized light in order to enhance light utilization efficiency in the electric optical device 44.

Specifically, the respective sub-beams converted into single polarized light by the polarization converter 414 are substantially superposed on the liquid crystal panel 441 of the electric optical device 44 by superposing lens 415. Since the rear projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the electric optical device 44. Incidentally, such polarization converter 414 is disclosed in, for instance, Japanese Patent Laid-Open publication No. Hei 8-304739.

The color separating optical system 42 has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 43 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441B function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights, in other words, in order to directly transmit the sub-beam incident on the incident-side lens 431 to the field lens 418. Though the red color light of the three color lights are transmitted to the relay optical system 43, other arrangement where, for instance, blue color light is transmitted thereto is possible.

The electric optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the electric optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system and absorbs the other light beam, which is constructed by forming a polarization film on a substrate of sapphire glass etc.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam.

The polarization axes of the incident-side polarization plate 442 and the irradiation-side polarization plate 443 are set orthogonal with each other.

The cross-dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

The above-described liquid crystal panels 441, the irradiation-side polarization plate 443 and the cross dichroic prism 444 are constructed as an integrated unit of optical device body 45.

Though not specifically shown, the optical device body 45 has the cross dichroic prism 444, a metal base for supporting the cross dichroic prism 444 from the lower side, a metal holding plate for holding the incident-side polarization plate 443 attached to the light-beam incident end of the cross dichroic prism 444, and liquid crystal panels 441 (441R, 441G and 441B) held by four pins 453 attached to the light-beam-incident side of the holding plate. A predetermined gap is secured between the holding plate and the liquid crystal panel 441, so that the cooling air is flowed through the gap.

A right-angle prism 48 is located on light-irradiation side of the cross dichroic prism 444, which reflects the color image combined by the cross dichroic prism 444 in a direction of the projection lens 46. A plurality of right-angle prisms 48 may be provided so as to avoid interference with the below-described duct.

As shown in FIG. 3, the projection lens 46 enlarges the color image reflected by the right-angle prism 48 and projects on the reflection mirror 30. The projection lens 46 is attached to a support member 200 by a non-illustrated head component.

The color image irradiated by the projection lens 46 is projected on the backside of the screen after being reflected by the reflection mirror, so that the color image on the screen can be viewed from the front side by spectators.

The above-described respective optical systems 41 to 44 and 48 are disposed in synthetic resin light guide 47 as the optical component casing. Though not shown, openings for letting the cooling air in and out are formed on the upper position and lower position of the light guide 47 corresponding to the electric optical device 44.

Back to FIG. 3, the control board 402 is a board having a controller including CPU etc., which controls the drive of the optical device constituting the optical unit 401 in accordance with inputted image information. The surroundings of the control board 402 are covered with non-illustrated metal shield member.

The support member 200 has a flat plate base member 201 placed opposite to the lower side of the lower cabinet 13, a plate-shaped lateral position adjuster 202 attached to the upper side of the base member 201, an inclination adjuster 203 fixed to the upper side of the lateral position adjuster 202 and inclined downward toward rear side, and a rotary position adjuster 204 opposing the upper side of the inclination adjuster 203. The adjusters 201 to 204 enables the adjustment of the attitude of the interior unit body 400 including right and left direction, inclination direction (upward shift direction) and in-plane rotation direction relative to the upper side of the base member 201.

The first power source has a first power source block and a lamp driving circuit (ballast). The first power source block supplies electric power fed from the outside through power cable connected to the inlet connector to the lamp driving circuit and the control board. The lamp driving circuit transfers the supplied electric power to the light source lamp. Incidentally, the surroundings of the first power source are covered with metal shield member to prevent leakage of electromagnetic noise.

The second power source has a second power source block and a sound signal amplifier. The second power source block supplies electric power fed from the outside through a power cable connected to the inlet connector. The sound signal amplifier is driven by the supplied electric power to output a signal to the below-described speaker box and the woofer box after amplifying the inputted sound signal. Incidentally, the surroundings of the second power source are also covered with metal shield member to prevent leakage of electromagnetic noise.

As shown in FIG. 1, the screen unit 50 is a relatively large transmissive screen of forty to sixty inches for projecting the optical image enlarged by the projection lens 46 (FIG. 4) of the optical unit 401 and reflected by the reflection mirror from the backside, which includes a screen 51 and a screen cover for disposing the screen 51 with a front side thereof being exposed.

The screen 51 is of four-layer construction of diffusion plate, Fresnel sheet, lenticule sheet and protection plate in an order from the side near the incident light, i.e. backside. The light beam irradiated by the projection lens and reflected by the reflection mirror is diffused by the diffusion plate and parallelized by the Fresnel sheet, which is diffused by optical beads constituting the lenticule sheet to obtain a display image.

As shown in FIG. 2, speaker boxes 70 are respectively attached to the right and left lateral sides 16 of the upper cabinet 12 as a body independent of the upper cabinet 12. The front side of the speaker box 70 is substantially flush with the front side of the screen unit 50 so that the both sides are approximately parallel in vertical direction.

As shown in FIG. 1, the screen cover 52 is fixed to the upper cabinet 12 with the screen 51 being disposed and the front side 18 of the upper cabinet 12 and the front side of the speaker box 70 being covered.

[2. Cooling Mechanism of Interior of Lower Cabinet]

As shown in FIG. 2, the rear projector 1 is provided with a lower cabinet cooling system 700 for cooling the interior of the lower cabinet 13. The lower cabinet cooling system 700 draws in the external cooling air from the intake opening 132L to the inside of the lower cabinet to cool the respective optical components 400, 200 etc. except for the electric optical device 44 in the lower cabinet 13 and discharges the air after having cooled the components from the exhaust opening 132R on the right side. In other words, a cooling channel for supplying cooling air from the left side to the right side along the front side of the screen unit 50 is formed in the lower cabinet 13.

The lower cabinet cooling system has a cooling channel mainly for cooling the control board 402, a light source cooling channel mainly for cooling the light source lamp 416 and a power source cooling channel mainly for cooling the power source by non-illustrated fans and ducts provided at a predetermined position. Incidentally, the external air is also introduced from the second intake opening 141A formed on the back cover 14 in the lower cabinet cooling system 700.

[3. Cooling Mechanism of Interior of Upper Cabinet]

Figure 5:
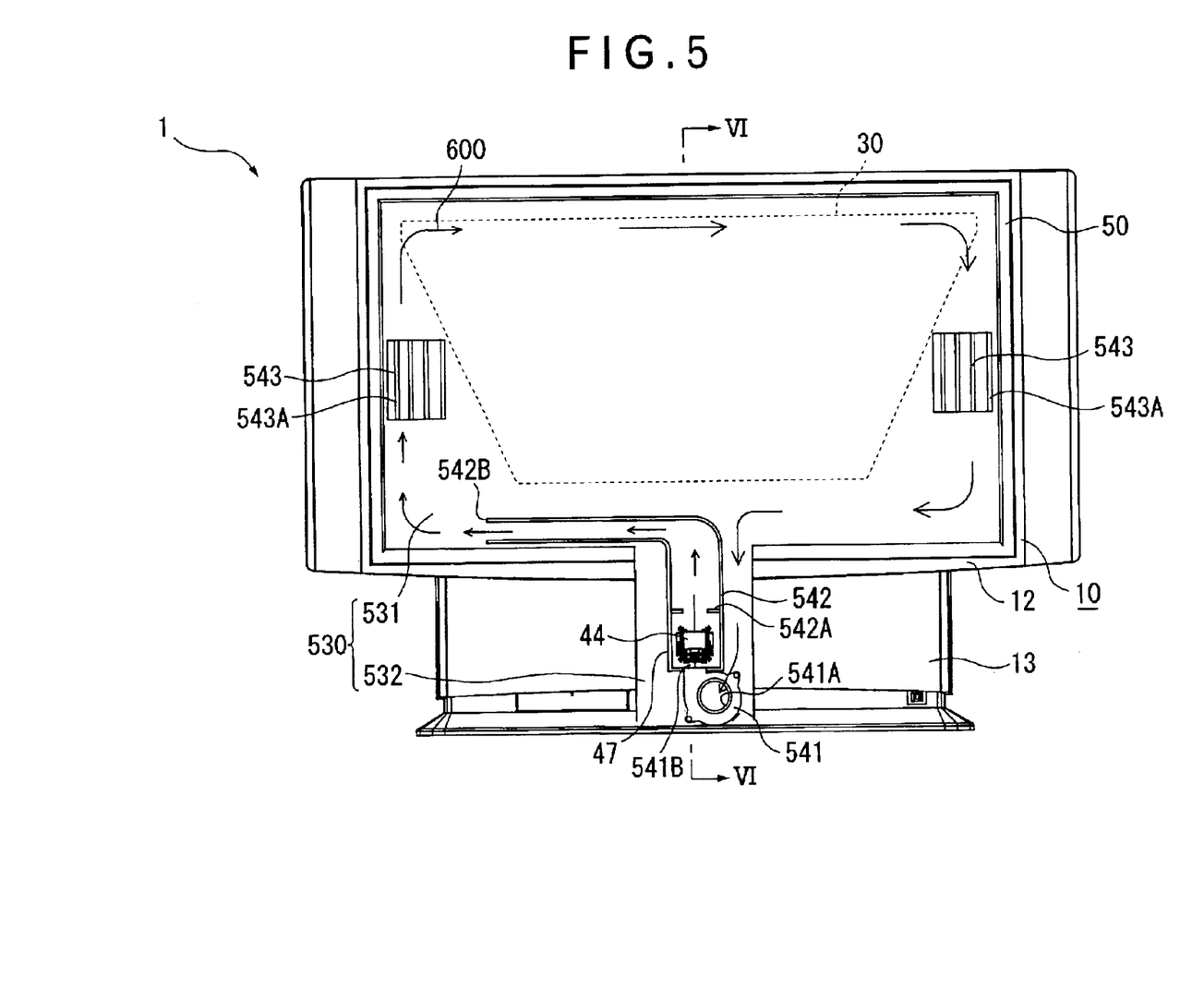
FIG. 5 is a vertical cross section schematically showing the rear projector seen from front side.
Figure 6:
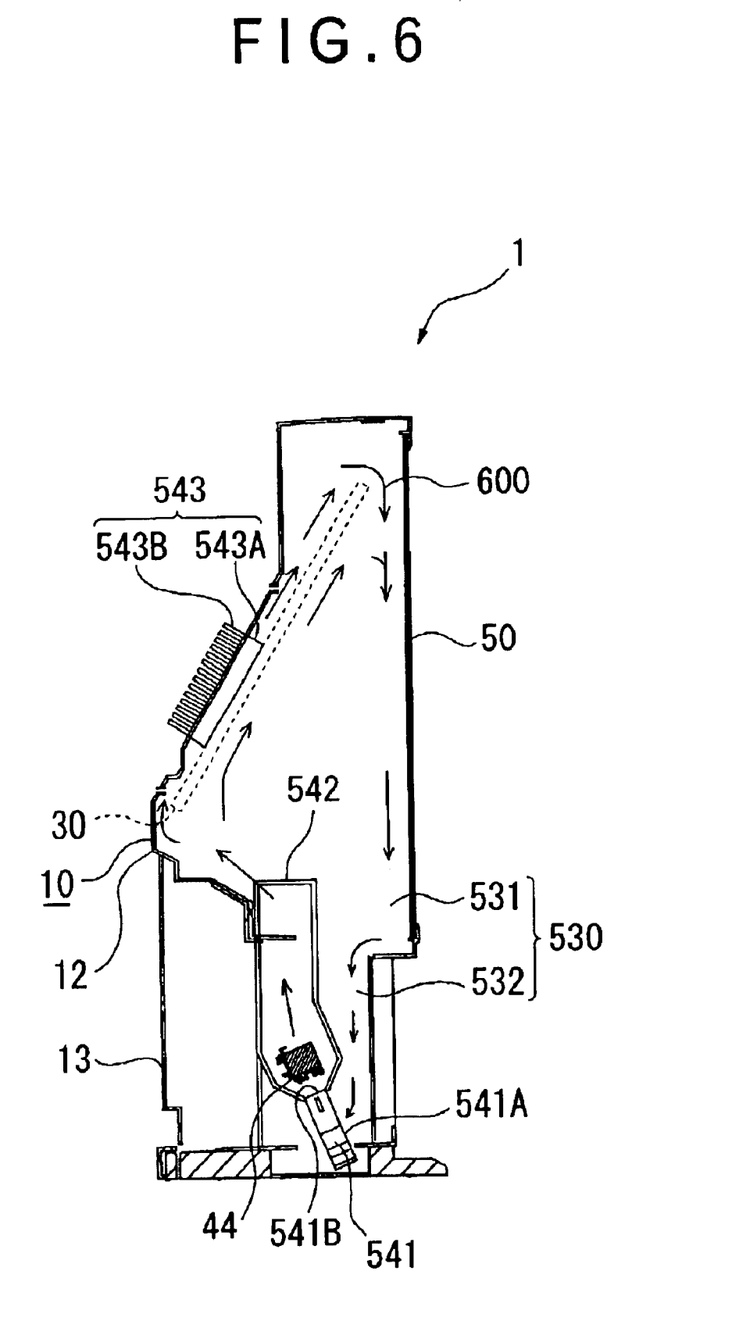
FIG. 6 is a cross section taken along VI—VI line in FIG. 5.

Next, an upper cabinet cooling system 600 as a cooling mechanism of the interior of the upper cabinet 12 will be described below with reference to FIGS. 5 and 6. FIG. 5 is a vertical cross section schematically showing the rear projector 1 seen from front side. FIG. 6 is a cross section taken along VI—VI line in FIG. 5.

The upper cabinet cooling system 600 is a circulative cooling system in the closed space formed in the rear projector 1. The closed space will be initially described below.

As shown in FIGS. 5 and 6, a planarly-viewed T-shaped closed space 530 spanning over the upper cabinet 12 and the lower cabinet 13 is provided in the rear projector 1. The closed space 530 has an upper space 531 as a space inside the upper cabinet 12 and a lower space 532 being in communication with the upper space 531 while being closely attached.

The upper space 531 is enclosed by the upper cabinet 12 and the screen unit 50 and the reflection mirror 30 is disposed thereinside as described above. An opening for passing the light beam irradiated by the projection lens is formed on a part of the lower side of the upper space 531. The internal air is shut in so that the air cannot intercommunicate with the outside but through the opening.

The lower space 532 is a vertically-extending box-shaped space formed on the backside of the central portion 131A (FIG. 1), where the light guide 47 extending in front and back direction intersects the box-shaped space to penetrate a part of a side thereof. A portion of the light guide 47 around the electric optical device 44 is located inside the lower space 532.

As described above, openings are formed on the light guide at the upper and lower sides around the electric optical device 44. As shown in FIG. 4, the side of the electric optical device 44 is surrounded by a head component (not specifically illustrated) for supporting three field lenses 418 and the projection lens 46. In other words, the portion of the light guide around the electric optical device 44 is shaped in a duct where the air can be circulated only in up and down direction by the vertically-provided openings.

As described above, the upper space 531, the space in the light guide 47 around the electric optical device 44 and the lower space constitute a mutually-intercommunicated closed space.

As shown in FIGS. 5 and 6, the electric optical device 44 in the light guide 47, a sirocco fan 541 as a circulation fan located below the electric optical device 44, a duct 542 covering the electric optical device 44 disposed thereabove, and a heat sink 543 as a radiator attached to the upper cabinet 12 are disposed in the closed space 530. According to the above arrangement, the sirocco fan 541 is located opposite to the upper cabinet 12 sandwiching the electric optical device 44.

The sirocco fan 541 is a fan for discharging the air taken in from an intake 541A located in rotary axis direction thereof to an outlet 541B located in rotary tangential direction.

The intake 541A is exposed to the lower space 532.

The outlet 541B is connected with an opening formed below the electric optical device 44 in the light guide 47 to close the opening.

The duct 542 is a component of L-shaped front elevation constructed as a tube, which has an intake opening 542A connected to an opening formed on the upper side of the light guide 47 to close the opening and an outlet opening 542B exposed to the left side of the upper space 531.

The duct 542 takes in the air discharged by the outlet 541B of the sirocco fan 541 from the intake opening 542A through the space around the electric device 44 formed in a duct, guides the air along the front side of the upper cabinet 12 and discharges the air from the outlet opening 542B to the upper space 531.

The heat sink 543 is a metal component for discharging the heat inside the upper cabinet to cool the air thereinside, which includes a plate-shaped heat receiver 543A provided in the upper cabinet 12 for absorbing heat, and a plurality of cooling fins 543B integrated with the heat receiver 543A to be projected toward the outside of the upper cabinet 12 for exchanging heat with the external air as shown in FIG. 6.

As shown in FIG. 5, the heat sink 543 is attached to right and left periphery of the rear side 17 of the upper cabinet 12. The left heat sink 543 is located above the outlet opening 542B of the duct 542.

The upper cabinet cooling system 600 is provided in the above-described closed space 530. As shown in FIGS. 5 and 6, the upper cabinet cooling system 600 circulates the cooling air in the closed space 530 to cool the electric optical device 44, the reflection mirror 30 and the interior of the upper cabinet 12 including and the backside of the screen unit 50.

In the upper cabinet cooling system 600, the cooling air in the closed space 530 is initially drawn in by the sirocco fan 541 to flow through the gap between the cross dichroic prism and the three liquid crystal panels of the electric optical system 44 from the bottom side to the top side to cool the electric optical device 44 including the liquid crystal panel, and is discharged to the upper side of the electric optical device 44.

The air having been discharged above the electric optical device 44 flows inside the upper cabinet 12 along the duct 542 to be discharged to the left periphery inside the upper cabinet 12. Since the air discharged to the left periphery in the upper cabinet 12 is heated by absorbing the heat of the electric optical device 44, the air flows upward.

The upward air touches the heat receiver 543A of the heat sink 543, to be deprived of heat. When the heat receiver 543A absorbs the heat, the heat is migrated to the cooling fin 543B. The cooling fin 543B having received the heat exchanges the heat with the air outside the upper cabinet 12 to radiate the heat toward the outside.

On the other hand, the air having cooled by the heat sink 543 goes up to the upper end of the upper cabinet 12 and flows to the right periphery of the upper cabinet 12 being pushed by the following air. The air flowing to the right periphery is drawn downward by the sirocco fan 541 and conducts heat-exchange with the right heat sink 543 on the halfway, which is then sucked in through the intake 541A of the sirocco fan 541.

As described above, the cooling air in the closed space 530 circulates in the closed space for directly and efficiently cooling the electric optical device 44, the reflection mirror 30, the backside of the screen unit 50 etc.

[4. Effect of Embodiment]

(1) Since the electric optical device 44 is cooled by circulating the air inside the closed space 530 by the sirocco fan 541, invasion of dust from the outside can be prevented and the reflection mirror 30 and the screen unit 50 in the upper cabinet 12 can be efficiently cooled as well as the electric optical device 44.

(2) Since a relatively large screen unit 50 of forty to sixty inches is provided on the upper cabinet 12, wide upper space 531 can be secured, thus sufficiently cooling the electric optical device 44 etc. using the vast space.

(3) Since the air discharged by the sirocco fan 541 passes around the electric optical device 44 and the air after cooling the component is discharged to the upper space 531 and circulated therein, the electric optical device 44 etc. can be efficiently cooled using the entire air in the closed space 530.

(4) Since the heat of the heated air having cooled the electric optical device 44 is radiated to the outside by the heat sink 543, the temperature of the cooling air can be lowered, thus enhancing the cooling efficiency of the interior of the projector.

(5) Since the heat sink 543 integrating the heat receiver 543A and the cooling fin 543B is used, the structure can be simplified and the number of components can be reduced.

(6) Since air convection inside the upper space 531 can be controlled by the duct 542, the electric optical device 44 etc. can be cooled using the entire air in the closed space 530. Since the air on the upper side of the electric optical device 44 is guided to the periphery of the upper space 531 by the duct 542, the entirety of the upper space 531 can be securely cooled.

(7) Since the duct 542 covers the electric optical device 44, the light leaked from the electric optical device 44 can be shut. Accordingly, reduction of contrast of the projected image caused by projecting the leaked light on the screen unit 50 can be avoided.

(8) Since the sirocco fan 541 having greater discharge pressure than an axial-flow fan is used, great discharge pressure of the air can be obtained, thereby securely circulating the air in the large closed space 530.

(9) Since the air above the electric optical device 44 is guided to the peripheral end of the upper space 531 by the duct 542, the entirety of the upper space can be securely cooled.

(10) Since a predetermined space is provided between the cross dichroic prism 444 and the liquid crystal panel 441, the liquid crystal panel 441 easily damaged by heat can be securely cooled.

(11) Among the optical components constituting the optical unit, since only the electric optical device 44 which is easily influenced by dust is cooled by the upper cabinet cooling system 600 and the other components such as power source and light source 411 are separately cooled by the lower cabinet cooling system 700, high-quality image can be presented to the spectators while preventing deterioration of image quality by the dust.

[5. Deformation of Embodiment]

The scope of the present invention is not restricted to the above-described embodiment, but includes other arrangement as long as an object of the present invention can be achieved, which includes following modifications.

For instance, though the duct is shaped approximately in L-shaped front elevation, other shape such as linear configuration is possible as long as the cooling air can be efficiently flowed therein. At this time, the cross section is not limited and may be designed in other shape such as circle, rectangle and polygon.

Though the sirocco fan 541 is used as the circulation fan, other fan such as axial-flow fan may be used. In other words, there is no limitation in the type of the fan.

Further, though the sirocco fan 541 is located on the lower side of the electric optical device 44 opposite to the upper cabinet 12, the sirocco fan 541 may be located on the upper side of the electric optical device 44. Alternatively, the electric optical device 44 may be located on both of the upper and lower sides of the electric optical device 44. In other words, the location of the sirocco fan 541 is not limited as long as the air can be flowed in the electric optical device 44, which may be determined in accordance with the layout of the components in the rear projector 1.

Though the heat sink 543 is used as a radiator in the above embodiment, other radiator such as Peltier element may be used. According to this arrangement, since heat migration from the inside of the upper cabinet 12 to the outside can be controlled by adjusting the applied voltage, cooling efficiency can be enhanced. However, the arrangement of the above embodiment is preferable in that the construction thereof is simple and production cost can be reduced.

Other construction and configuration of the components in implementing the present invention may be designed in any manner as long as an object of the present invention can be achieved.

What is claimed is:

1. A rear projector comprising:
an image generator having an electric optical device that modulates the light beam irradiated by a light source to form an optical image in accordance with image information and a projection optical system that enlarges and projects the optical image;
a casing that disposes the image generator; and
a screen exposed on one of the sides of the casing onto which the optical image formed by the image generator is projected,
the casing having a first casing that disposes the image generator and a second casing provided with the screen,
the electric optical device being located in a closed space including a space inside the second casing,
wherein a circulation fan that circulates an air inside the closed space is provided in the closed space.

2. The rear projector according to claim 1, wherein the circulation fan is located opposite to the second casing relative to the electric optical device.

3. The rear projector according to claim 1, wherein a radiator that radiates the heat inside the second casing to cool the air is provided on the second casing.

4. The rear projector according to claim 3, the radiator comprising a heat receiver provided inside the second casing and a plurality of cooling fins connected with the heat receiver and projected to the outside of the second casing.

5. The rear projector according to claim 1, further comprising a duct inside the second casing, the duct guiding the air discharged by the circulation fan along the inner circumference of the second casing.

6. The rear projector according to claim 5, wherein the duct covers the electric optical device.

7. The rear projector according to claim 1, wherein the circulation fan is a sirocco fan that discharges the air drawn in rotation axis direction to rotary tangential line direction.

8. A rear projector comprising:

an image generator having an electric optical device that modulates the light beam irradiated by a light source to form an optical image in accordance with image information and a projection optical system that enlarges and projects the optical image;

a casing that disposes the image generator; and a screen exposed on one of the sides of the casing onto which the optical image formed by the image generator is projected, the casing having a first casing that disposes the image generator and a second casing provided with the screen, the electric optical device being located in a closed space, a duct inside the second casing, the duct guiding the air discharged by a circulation fan provided in the closed space along the inner circumference of the second casing.

9. The rear projector according to claim 8, wherein the duct covers the electric optical device.

* * * * *

UNITED STATES PATENT AND TRADEMARK OFFICE
CERTIFICATE OF CORRECTION

PATENT NO. : 6,805,446 B2
DATED : October 19, 2004
INVENTOR(S) : Jun Arai et al.

It is certified that error appears in the above-identified patent and that said Letters Patent is hereby corrected as shown below:

<u>Title page,</u>
Item [75], Inventors, should read -- Jun Arai, Matsumoto-shi and Haruyoshi Yamada, Shiojiri-shi --.

Signed and Sealed this

Sixteenth Day of August, 2005

JON W. DUDAS
*Director of the United States Patent and Trademark Office*